(12) United States Patent
Ayre et al.

(10) Patent No.: US 10,517,426 B2
(45) Date of Patent: Dec. 31, 2019

(54) COOKING APPARATUS

(71) Applicant: Easygrill Pty Ltd, Abbotsford, Victoria (AU)

(72) Inventors: David Ayre, Victoria (AU); Callum Macleod, Ferntree Gully (AU); George Kotsiopoulos, Ferntree Gully (AU); Toby Hartley, Ferntree Gully (AU); John Petschel, Ferntree Gully (AU)

(73) Assignee: EASYGRILL PTY LTD, Victoria (AU)

( * ) Notice: Subject to any disclaimer, the term of this patent is extended or adjusted under 35 U.S.C. 154(b) by 41 days.

(21) Appl. No.: 15/314,349

(22) PCT Filed: May 29, 2015

(86) PCT No.: PCT/AU2015/000325
§ 371 (c)(1),
(2) Date: Nov. 28, 2016

(87) PCT Pub. No.: WO2015/179904
PCT Pub. Date: Dec. 3, 2015

(65) Prior Publication Data
US 2017/0196399 A1    Jul. 13, 2017

(30) Foreign Application Priority Data
May 30, 2014    (AU) ................................ 2014902073

(51) Int. Cl.
*A47J 37/06*    (2006.01)
*A47J 33/00*    (2006.01)
(52) U.S. Cl.
CPC ........... *A47J 37/0611* (2013.01); *A47J 33/00* (2013.01); *A47J 2037/0617* (2013.01)

(58) Field of Classification Search
CPC .. A47J 27/62; A47J 37/04; A47J 37/06; A47J 37/0611; A47J 37/0676; A47J 37/067; A47J 2037/0614
(Continued)

(56) References Cited

U.S. PATENT DOCUMENTS

2003/0127451 A1    7/2003  Lile
2005/0279222 A1*  12/2005  Nevarez ............... A47J 37/0611
                                                                99/349
(Continued)

FOREIGN PATENT DOCUMENTS

CN        2864418       1/2007
JP       2012247145    12/2012
(Continued)

OTHER PUBLICATIONS

International Search Report dated Aug. 4, 2015 (4 pages) out of PCT priority Application No. PCT/AU2015/000325.
(Continued)

*Primary Examiner* — Brian W Jennison
(74) *Attorney, Agent, or Firm* — Barnes & Thornburg LLP; G. Peter Nichols

(57) ABSTRACT

A cooking apparatus includes a pair of plates in between which a food item is to be cooked, at least one of the plates having a heating element for cooking the food item. The cooking apparatus has a user interface for selecting a cooking preference, a measurement sensor for measuring a distance between the pair of plates when the food item lies between the pair of plates, a weight sensor for measuring weight of the food item, and a control system for receiving at least one signal from the measurement and weight sensors to determine a cooking profile for cooking the food item to the cooking preference and to calculate a total amount of energy required to cook the food item according to the
(Continued)

cooking profile and an amount of energy to be transferred per unit time to the food item, and to control power supply to the heating element based on the calculated amount of energy transferred per unit time to the food item.

20 Claims, 17 Drawing Sheets

(58) Field of Classification Search
USPC .. 99/327–334, 342, 349–351, 374, 379, 422
See application file for complete search history.

(56) References Cited

U.S. PATENT DOCUMENTS

2006/0065263 A1* 3/2006 Barritt ................ F24C 7/082
126/41 R
2007/0028780 A1* 2/2007 Popeil ................ A47J 37/1209
99/407
2007/0254078 A1 11/2007 Calzada et al.
2015/0004289 A1 1/2015 Volatier

FOREIGN PATENT DOCUMENTS

| WO | WO 2007/127072 | 11/2007 |
| WO | WO 2013/107964 | 7/2013 |
| WO | WO 2014/144248 | 9/2014 |

OTHER PUBLICATIONS

Written Opinion dated Aug. 4, 2015 (8 pages) out of PCT priority Application No. PCT/AU2015/000325.
Supplementary Search Report issued in Appl. No. EP15798999.7 (2017).

* cited by examiner

COOKING APPARATUS

This application claims priority to International Application No. PCT/AU2015/000325 filed May 29, 2015 and to Australian Application No. 2014902073 filed May 30, 2014: the entire contents of each are incorporated herein by reference.

FIELD OF INVENTION

The present invention relates to an apparatus for cooking food, and in particular for cooking food between a pair of plates.

BACKGROUND OF THE INVENTION

Food presses, such as sandwich presses or hamburger presses, use a pair of plates, whereby the sandwich, for example, is placed between a pair of heated plates to warm the bread and its filling. However, sandwich presses rely on a user to insert the sandwich and monitor the time spent warming the sandwich before removing it. As often happens, the user can become distracted and forget to remove the cooked sandwich, which then burns. It is known to provide timing devices on sandwich presses to alert the user that the food item is cooked but these are not always accurate to properly cook the food item, and require setting by the user.

On the other hand, food presses can also inconsistently cook food items, leading to undercooking. Taking for example sandwiches, thick sandwiches in particular are prone to undercooking, where the heat from the plates to the center of the sandwich takes a longer time to transfer than anticipated. To address this problem, the sandwich has to be squashed between the plates to improve heat transfer from the plates to the sandwich. This is undesirable as it inevitably crushes the sandwich, spilling its filling, and can generally affect the palatability of the sandwich.

Furthermore, inconsistent cooking may also cause food poisoning particularly if the sandwich is not freshly prepared and insufficient heat has been applied to kill any bacteria.

It is desirable to provide a cooking apparatus that can accurately and consistently heat or cook a variety of food items.

SUMMARY OF THE INVENTION

In accordance with the invention, there is provided a cooking apparatus comprising a pair of plates in between which a food item is to be cooked, at least one of the plates having a heating element for cooking the food item, the cooking apparatus having a user interface for selecting a cooking preference, a measurement sensor for measuring a distance between the pair of plates when the food item lies between the pair of plates, a weight sensor for measuring weight of the food item, and a control system for receiving at least one signal from the measurement and weight sensors to determine a cooking profile for cooking the food item to the cooking preference and to calculate a total amount of energy required to cook the food item according to the cooking profile and an amount of energy to be transferred per unit time to the food item, and to control power supply to the heating element based on the calculated amount of energy transferred per unit time to the food item.

The cooking apparatus calculates and applies an amount and rate of energy input to cook the food item according to the cooking profile, which is a temperature cooking profile, based on the thickness and/or weight of the food item. The cooking profile specifies how the total amount of energy required to cook the food item is transferred to the food item during cooking.

Suitably, whilst cooking, the control system monitors and continuously adjusts the temperature to achieve the desired cooking outcome.

The cooking preference may be based on one or more variables including type of food item and the user's preferred cooking outcome for the food item. For example, a user can use the user interface to identify the type of food item, for example, a piece of steak or chicken, and the desired cooking outcome, for example, rare or well done.

The type of food item for which the control system may be programmed to include in a cooking preference includes, but is not limited to, fish, red meat, poultry, pork, vegetables and bread, or combinations thereof such as a sandwich. The preferred cooking outcome includes but is not limited to 'well done', 'medium', 'rare' and 'warm', or a standard selection for food items including sandwiches such as 'done'.

Based on the cooking preference, the cooking profile used to cook the food item is determined by the control system. The cooking profile in turn determines the cooking temperature or range of cooking temperatures to cook the food item to the cooking preference.

Suitably, the control system compares the amount of energy transferred to the food item to the total amount of energy required to cook the food item during the cooking process.

The comparison between the rate of energy transferred to the food item and the total amount of required energy to cook the food item may be carried out continuously or at discrete intervals. For example, the comparison may be conducted at 2, 5, 10, 15, 20 or 30 second intervals, or any time in between. Alternatively, the comparison may be conducted a set number of times before the projected completion time, for example, once or twice in the cooking process. Still alternatively, the comparison may be continuous throughout the cooking process.

Preferably, the rate of energy transferred to the food item is calculated per second of time.

In an embodiment, the control system predicts when the food item is cooked by monitoring the amount of energy transferred to the food item. The food item is predicted as cooked when the amount of energy transferred to the food item substantially equals the total amount of energy required to cook the food item.

In an embodiment, the cooking apparatus stops transferring energy into the food item once the energy transferred to the food item is substantially equal to the total amount of energy required to cook the food item. In this respect, the control system stops supplying power to the heating element once the energy transferred to the food item equals the amount of energy required to cook the food item.

In an embodiment, the control system reduces the power supply to the heating element to maintain the plates at a predetermined temperature after cooking completes.

Generally, the controller uses a closed loop transfer function (also known as a feed forward system) to regulate the cooking temperature to ensure that the food item is cooked according to the selected cooking preference. In this respect, the controller identifies a specific cooking outcome for a selected food item and regulates the cooking temperature to achieve the outcome.

In contrast, most conventional cooking apparatuses use a feedback system whereby temperature is set and the apparatus simply attempts to maintain that desired setting, for example, a sandwich press. The user then decides when the food item is cooked to their satisfaction. There is no closed loop system generating a specified cooking outcome for a selected food item.

The control system preferably calculates the total energy required to cook the food item according to the cooking profile based on the weight of the food item. More preferably, the control system calculates the energy required to cook the food item according to the cooking profile based on the weight of the food item and temperature difference between the selected cooking temperature to achieve the preferred cooking outcome and the initial food item temperature.

The control system preferably calculates the total energy required to cook the food item according to the cooking profile based on the weight of the food item, the specific heat capacity of the food item, the required cooking temperature to achieve the preferred cooking outcome and the initial food item temperature.

The total energy required to cook the food item according to the cooking profile may be calculated using the following equation, wherein Q is the total energy required to cook the food item according to the cooking profile, $C_p$ is the specific heat capacity of the food item, M is the weight of the food item, $T_2$ is the required (target) temperature to achieve the selected cooking preference and $T_1$ is the initial food item temperature:

$Q=Mc_p(T_2-T_1)$ $T_2$ is preferably measured in the core of the food item.

The cooking temperature is the temperature required to achieve the target temperature of the food item. The cooking temperature may not be the same as the target temperature. For example, the cooking temperature may be initially set higher than the target temperature in order to sear the food item, the cooking temperature may subsequently be lowered to ensure that the food item does not overcook after searing.

The control system preferably calculates the amount of energy transferred to the food item per unit time during the cooking process based on the thickness and/or weight of the food item. The control system can also calculate the amount of energy transferred into the food item during the cooking process based on the change in temperature of each of the plates. For example, the amount of energy may be calculated based on the surface area of the food item in contact with the pair of plates and the change in temperature of each of the plates of the cooking apparatus.

The energy (q) transferred to the food item per unit time may be calculated using the following equation:

$q=\Delta T_1 R_{th}+\Delta T_2 R_{th}$, where $\Delta T_{1/2}=$
$T_{plate\ 1/2}-T_{food\ item\ temp}$ $\Delta T_1$ is the temperature difference between a first plate ($T_{plate\ 1}$) and the food item temperature ($T_{food\ item\ temp}$) per unit time and $\Delta T_2$ is the temperature difference between a second plate ($T_{plate\ 2}$) and the food item temperature ($T_{food\ item\ temp}$) per unit time.

Suitably, the first plate is a top plate of the cooking apparatus and the second plate is a bottom plate of the cooking apparatus.

In an embodiment, the thermal resistance of the food item may be calculated based on the surface area of the food item in contact with the pair of plates, the thickness of the food item and the thermal conductivity of the food item.

The thermal resistance ($R_{th}$) of the food item may be calculated using the following equation, wherein A is the calculated surface area, (x) is the measured thickness and (k) is the thermal conductivity of the food item:

$$R_{th}=\frac{kA}{x}$$

In an embodiment, the surface area (A) of the food item in contact with the plates is calculated based on the thickness, weight and density of the food item.

The surface area (A) of the food item in contact with the plates may be calculated using the following equation, wherein (x) is the measured thickness, (M) is the weight and (p) is the density of the food item:

$$A=\frac{M}{x\rho}$$

In another embodiment, the surface area of the food item in contact with the plates is estimated using sensors.

Preferably, the sensors are temperature sensors. Other sensors such as pressure sensors may be used.

A temperature gradient exists between the surface and the core of the food item. The surface temperature of the food item will be close to the surface temperature of the plate in contact with the food item and the temperature of the rest of the food item will be a function of the distance from the plate, the heat capacity of the food item and the temperature differential between the plate and the food item.

The calculated net food item temperature is cumulative, adding the incremental temperature gain to the previous temperature value.

On this basis, the amount of energy transferred into the food item during the cooking process may be calculated and measured against the total amount of energy required to cook the food item accordingly to the cooking profile. The cooking process completes when the amount of energy transferred to the food item equals the total amount of energy required to cook the food item.

The cooking profile may maintain the food item at a predetermined temperature after cooking. This may prevent the cooked food item from getting cold before it is consumed. This may avoid the need for a resting period after the food is cooked to allow the cooked food item to reach its target temperature.

Suitably, the predetermined temperature is the target temperature. This may allow the cooked food item to be maintained at the target temperature for a prolonged period of time without overcooking. In this embodiment, the plates are preferably made from a high thermal conductivity material to allow the temperature of the plates to reach the predetermined temperature quickly from the cooking temperature. In contrast, a low thermal conductive material increases the risk of the food item overcooking due to an excessive amount of energy being transferred to the food item when the plates cool to the selected temperature.

Suitably, the thermal conductivity of the plates ranges from 30-400 $Wm^{-1}\ K^{-1}$. Preferably, the thermal conductivity of the plates ranges from 200-400 $Wm^{-1}\ K^{-1}$. More preferably, the thermal conductivity of the plates ranges from 200-300 $Wm^{-1}\ K^{-1}$.

The cooking temperature and/or the cooking duration may be adjusted when the option to maintain the cooked food item at a predetermined temperature is selected.

The plates are relatively movable with respect to each other to lie against the food item therebetween. The plates are preferably parallel and may be oriented at any angle from a horizontal to a vertical position. Suitably, the pair of plates are horizontally arranged to define top and bottom plates in between which a food item is to be cooked. Both plates suitably include heating elements, although the apparatus may function with only one element in one plate. Each plate may include two elements to provide temperature zoning. This allows separate food items to be cooked using different cooking profiles at a time.

In an embodiment, either or both plates may be made of aluminum. Suitably, either or both the plates further include a matrix of embedded copper and an outer coating of stainless steel.

In an embodiment, either or both plates may have high thermal inertia to maintain sufficient heat to cook the food item.

Each plate may include a thermocouple for measuring the local temperature and feedback to the control system. The initial temperature of the food item may be measured by the thermocouple. The thermocouple may also allow the cooking apparatus to determine the location of the food item by measuring the temperature drop when a food item is placed on the plate. The temperature drop detected by the thermocouple may be used to estimate the surface area of the food item.

Suitably, each plate includes four thermocouples to improve the accuracy of the temperature measurement.

The pair of plates may be automated to be movable relative to one another and to maintain contact with the food item during the cooking process based on feedback from a plate pressure sensor.

One or both plates may include a plate pressure sensor to measure pressure of a plate against a food item during cooking and to transmit a corresponding signal to the control system to maintain a predetermined pressure of the plate on the food item during cooking.

One of the plates may be automated to disconnect from the food item after completion of the cooking time.

The power output of each heating element may range from 50-5,000 W. Suitably, the power output of each heating element ranges from 1000-1,200 W.

The user interface may include an LED screen for displaying the options available for selecting a cooking profile.

The measurement sensor (also known as a plate separation sensor) may take many forms for measuring the distance between, i.e. the separation of, the plates.

The measurement sensor may be a position/angle/displacement sensor located at a pivot through which the plates are linked and rotated to separate. The pivot may be a pivot of a lever arrangement where specifically the handle is levered to the cooking apparatus to open and close one plate relative to the other. In this embodiment, the measurement sensor measures the angle at which the handle is pivoted when a food item is placed between the pair of plates. The angle measurement is processed by the control system to calculate the distance between the pair of plates.

The measurement sensor may be located at any position on one or both plates to measure the distance between the pair of plates. For example, the measurement sensor may be located on an edge of a plate and transmits a signal to the other plate or another sensor on the other plate to determine the positions of the pair of plates relative to each other. Suitably, at least two measurement sensors are mounted on the front and rear of the cooking apparatus.

The measurement sensor may be an acoustic or an optical sensor. For example, an ultrasonic sensor could be used for measuring distance between the pair of plates. The ultrasonic sensor transmits a signal from one plate that is reflected off the other plate and the time taken for the signal to reflect back is used to measure the distance between the plates.

The measurement sensor may be an optical/light sensor that uses a light beam to measure the distance between the pair of plates. For example, the sensor could be an infra-red sensor or an optical position sensor. Preferably, the sensor includes a plurality of light beams that can be sequentially disrupted or blocked to measure the distance between the pair of plates.

The measurement sensor may have an accuracy ranging from 1-55 mm. Suitably, the accuracy ranges from 1-3 mm.

The measurement sensor may be located on one plate and comprises a sliding pin mounted on one end to a printed circuit board located within the plate and on the other end to a guide mounted to a handle of the cooking apparatus. The sliding pin may be located on a side of the plate and is mechanically connected to the handle via a slot on the guide to be movable with the relative separation of the plates. Movement of the handle, which in turn moves the sliding pin, transmits a signal from the measurement sensor to the control system which calculates the distance between the pair of plates.

The measurement sensor may measure the distance between the pair of plates directly or indirectly. For example, an indirect measurement method involves measuring the angle at which a levered handle of the cooking apparatus is pivoted when a food item lies between the pair of plates, and the distance between the plates is calculated using the measured angle. An example of a direct measurement method involves using an ultrasonic sensor to measure the distance between the pair of plates by transmitting a signal from one plate to the other.

The weight sensor may be in the form of a load cell. Suitably, the load cell is positioned within or underneath the plate.

The weight sensor may have an accuracy ranging from 0.05-15%.

The user interface may be a control panel on the cooking apparatus, a smart phone app, a remote control or the like. The user interface may include an LCD or LED display.

The control system may be a micro-processor PCB. The PCB may be mounted on a heat sink. A USB interface may be used for programming updates and a RJ45 network connection may be used for communicating with the user interface. In an embodiment, the USB is used for logging data and a multi-pin connection ribbon is used to interface with a CPU for programming updates.

The control system may be programmed with predetermined settings of specific heat capacity, thermal resistance and thermal conductivity values, and alternatively or additionally, based on data received from the user interface.

The control panel includes an override for manually controlling the cooking profile regardless of the distance between the pair of plates or the weight of the food item. For example, the cooking temperature may be manually entered using the user interface into the control panel.

The override may also allow a user to cook a food item regardless of whether both plates are in contact with the food item. For example, when the top plate is lifted from the food item during cooking, the control system allows the cooking process to continue on the basis that energy is only transferred via the lower plate. When the top plate re-contacts the food item, the control system re-adjusts to continue the cooking process on the basis that energy is transferred via both plates. The cooking apparatus may include a rack that is actuated to lift the food item off a bottom plate after completion of the cooking time. Actuation of the plates and/or the rack after completion of the cooking time is automated by the control system.

The control system may switch off the heating element after completion of the cooking process. Alternatively or additionally, the control system may transmit an audio and/or visual indication to alert a user of completion of the cooking process.

The cooking apparatus may include zoned cooking areas, whereby each zone comprises a heating element that is localised to function independently to heat the corresponding zone at an independent cooking profile to the other zones.

In accordance with the invention, there is also provided a control system for a cooking apparatus, the cooking apparatus comprising a pair of plates, at least one of the plates having a heating element for cooking a food item, a measurement sensor for measuring a distance between the pair of plates when the food item lies between the pair of plates, and a weight sensor for measuring a weight of the food item, wherein the control system is configured to:
receive data from a user interface to select a cooking preference;
receive a signal from the measuring sensor to calculate the distance between the pair of plates;
receive a signal from the weight sensor to determine the weight of the food item;
determine a cooking profile to cook the food item according to the cooking preference, where the cooking profile is determined based on at least one signal from the measuring sensor and the weight sensor;
calculate a total amount of energy required to cook the food item according to the cooking profile based on the signal from the weight sensor;
calculate an amount of energy per unit time to be transferred to the food item per unit time based on the signal from the measuring sensor;
switch on the heating element; and
control the heating element based on the cooking profile.

The control system may control the heating element to vary the amount of energy transferred to the food item per unit time. This, in turn, may be used to control the cooking time.

The control system may compare the amount of energy required to cook the food item according to the cooking profile and the amount of energy transferred to the food item per unit time to determine the percentage completion of the cooking process.

The control system may compare the amount of energy transferred to the food item to the total amount of energy required to cook the food item at discrete intervals.

The control system may perform the following steps for controlling the heating element:
determine a time that has lapsed since the heating element is switched on;
determine a temperature of the heating element based on the cooking profile from the time since the heating element is switched on;
measure a temperature of the heating element; and
control the heating element to either increase or decrease in temperature based on the cooking profile and the current temperature of the heating element to thereby either increase or decrease the temperature of the heating element.

The control system may determine a cooking temperature based on the cooking profile.

The control system may calculate the total amount of energy required to cook the food item according to the cooking profile based on the weight of the food item.

The control system may predict when the food item is cooked by monitoring the amount of energy transferred to the food item. The food item is predicted as cooked when the amount of energy transferred to the food item substantially equals the total amount of energy required to cook the food item.

The control system may compare the amount of energy transferred to the food item to the total amount of energy required to cook the food item during the cooking process.

The control system may stop the power supply to the heating element once the energy transferred to the food item is equals the amount of energy required to cook the food item.

The control system may reduce the power supply to the heating element to maintain the plates at a predetermined temperature after cooking completes.

The control system may use a closed loop transfer function to regulate cooking temperature to ensure that the food item is cooked according to the selected cooking preference.

The control system may calculate the total amount of energy required to cook the food item according to the cooking profile based on the weight of the food item and a temperature difference between cooking temperature and initial food item temperature.

The control system may calculate the total amount of energy required to cook the food item according to the cooking profile using the following equation, wherein Q is the total amount of energy required to cook the food item according to the cooking profile, $C_p$ is the specific heat capacity of the food item, M is the weight of the food item, $T_2$ is the required (target) temperature to achieve the cooking preference and $T_1$ is the initial food item temperature:

$$Q = M c_p (T_2 - T_1)$$

The control system may calculate the amount of energy transferred to the food item per unit time (e.g. per second) based on the thickness and weight of the food item.

Suitably, the control system calculates the amount of energy transferred to the food item per unit time (q) using the following equation, wherein $\Delta T_1$ is the temperature difference between a first plate ($T_{plate\ 1}$) and the food item temperature ($T_{food\ item\ temp}$) per unit time and $\Delta T_2$ is the temperature difference between a second plate ($T_{plate\ 2}$) and the food item temperature ($T_{food\ item\ temp}$) per unit time and $R_{th}$ is the thermal resistance of the food item:

$$q = \Delta T_1 R_{th} + \Delta T_2 R_{th}, \text{ wherein } \Delta T = T_{plate\ 1/2} - T_{food\ item\ temp}$$

and, wherein the thermal resistance of the food item is calculated based on the surface area of the food item in contact with the pair of plates, the thickness of the food item and the thermal conductivity of the food item.

The control system may automate the pair of plates to maintain contact with the food item during cooking based on feedback from a plate pressure sensor.

The control system may actuate a rack on the cooking apparatus to lift the food item off a plate after completion of cooking.

In accordance with the invention, there is also provided a method of cooking a food item using an apparatus comprising a pair of plates in between which a food item is to be cooked and at least one of the plates having a heating element for cooking a food item including the steps of: selecting a cooking preference; measuring a distance between the pair of plates when the food item lies therebetween to determine thickness of the food item; measuring a weight of the food item; determining a cooking profile for cooking the food item according to the cooking preference based on at least one of the thickness of the food item and the weight of the food item; calculating a total amount of energy required to cook the food item according to the cooking profile based on the weight of the food item; calculating an amount of energy transferred per unit time to the food item based on the thickness of the food item; and controlling power supply to the heating element based on the amount of energy transferred per unit time to the food item to cook the food item.

The method may include determining a cooking temperature based on the cooking profile.

The method may include calculating the total amount of energy required to cook the food item according to the cooking profile based on the weight of the food item.

The method may include comparing the total amount of energy required to cook the food item according to the determined cooking profile and the amount energy transferred to the food item per unit time to determine the percentage completion of cooking.

The method may include comparing the amount of energy transferred to the food item to the total amount of energy required to cook the food item at discrete intervals.

The method may include predicting when the food item is cooked by monitoring the amount of energy transferred to the food item. The food item is predicted as cooked when the amount of energy transferred to the food item substantially equals the total amount of energy required to cook the food item.

The method may include comparing the amount of energy transferred to the food item to the total amount of energy required to cook the food item during the cooking process.

The method may include stopping the power supply to the heating element once the energy transferred to the food item is equals the amount of energy required to cook the food item.

The method may include reducing the power supply to the heating element to maintain the plates at a predetermined temperature after cooking completes.

The method may include using a closed loop transfer function to regulate cooking temperature to ensure that the food item is cooked according to the selected cooking preference.

The method may include calculating the total amount of energy required to cook the food item according to the cooking profile based on the weight of the food item and a temperature difference between cooking temperature and initial food item temperature.

The method may include calculating the total amount of energy required to cook the food item according to the cooking profile using the following equation, wherein Q is the total amount of energy required to cook the food item according to the cooking profile, $C_p$ is the specific heat capacity of the food item, M is the weight of the food item, $T_2$ is the required (target) temperature to achieve the cooking preference and $T_1$ is the initial food item temperature:

$$Q = Mc_p(T_2 - T_1)$$

The method may include calculating the amount of energy transferred to the food item per unit time (e.g. per second) based on the thickness and weight of the food item.

Suitably, calculating the amount of energy transferred to the food item per unit time (q) uses the following equation, wherein $\Delta T_1$ is the temperature difference between a first plate ($T_{plate\ 1}$) and the food item temperature ($T_{food\ item\ temp}$) per unit time and $\Delta T_2$ is the temperature difference between a second plate ($T_{plate\ 2}$) and the food item temperature ($T_{food\ item\ temp}$) per unit time and $R_{th}$ is the thermal resistance of the food item:

$$q = \Delta T_1 R_{th} + \Delta T_2 R_{th}, \text{ wherein } \Delta T = T_{plate\ 1/2} - T_{food\ item\ temp}$$

and, wherein the thermal resistance of the food item is calculated based on the surface area of the food item in contact with the pair of plates, the thickness of the food item and the thermal conductivity of the food item.

The method may include automating the pair of plates to maintain contact with the food item during cooking based on feedback from a plate pressure sensor.

The method may include lifting the food item off a plate after completion of cooking.

BRIEF DESCRIPTION OF DRAWINGS

Embodiments of the present invention are hereinafter described by way of example only, with reference to the accompanying drawings, wherein.

DETAILED DESCRIPTION

Several embodiments of the cooking apparatus in accordance with the invention are illustrated. All embodiments generally relate to a cooking apparatus comprising a pair of plates in between which a food item is cooked. At least one of the plates has a heating element for cooking the food item. The cooking apparatus further includes a user interface for selecting a cooking preference.

In one embodiment, the selected cooking preference determines the available cooking temperature profiles (hereinafter referred to as "cooking profile") to cook the food item according to the user preference.

A measurement sensor and a weight sensor on the cooking apparatus measures a distance between the pair of plates when a food item is placed between the plates and the weight of the food item, respectively, and each of these sensors sends a signal to a control system (also referred to as a controller) in the apparatus. The control system calculates the total amount of energy required to cook the food item according to the cooking preference and the amount of energy to be transferred to the food item per unit time using either one or both of these signals.

A cooking profile is also determined by the control system, or may be pre-selected by a user, which specifies the cooking temperature or range of cooking temperatures for cooking the food item according to the cooking preference using the calculated total amount of energy. The control system then controls the heating element to cook the food item to a desired result.

Figure 1:
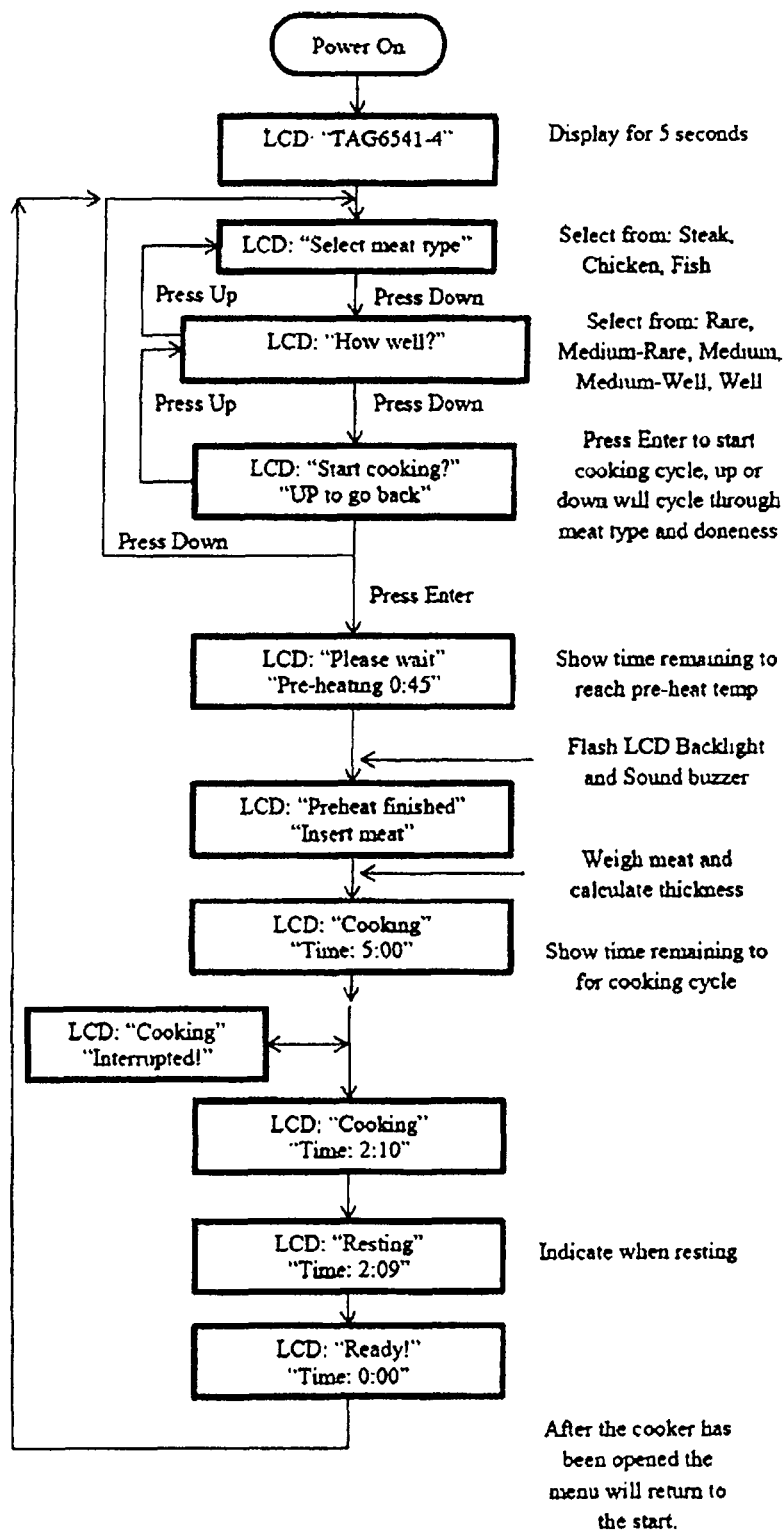
FIG. 1 is a flow chart illustrating the sequence of messages displayed on the user interface during the cooking process according to one form of the invention.
Figure 2:
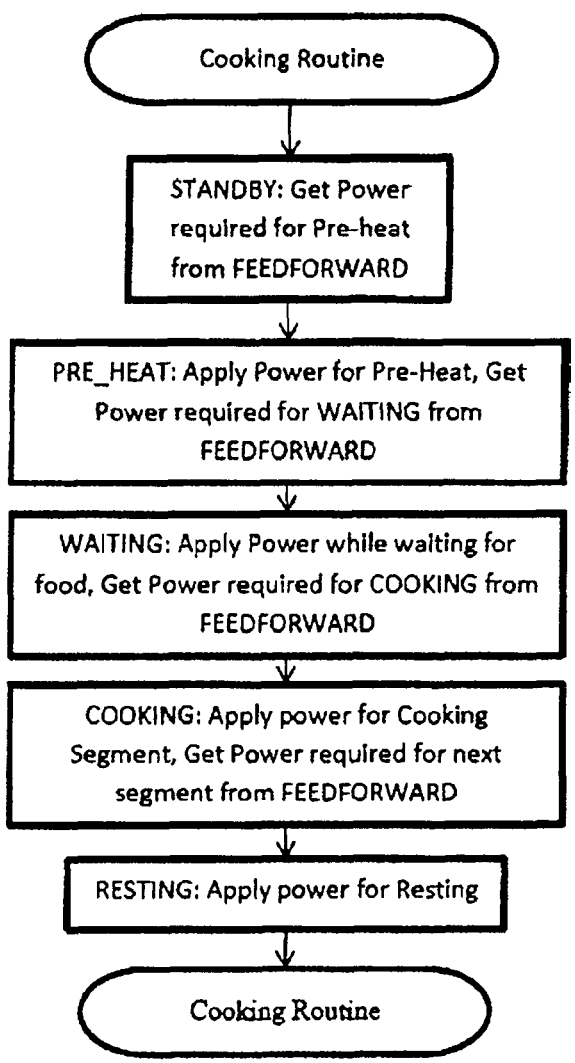
FIG. 2 is a flow chart illustrating the steps taken by the control system during the cooking process according to one form of the invention.

A flowchart illustrating the sequence of messages displayed on the user interface during the cooking process according to one embodiment of the invention is shown in FIG. 1. Once the user commences the cooking process by pressing the Start button on the user interface, the control system heats the plates in a "Preheating" step to a cooking temperature determined by the cooking profile. During the preheating step, the control system determines the power required for the subsequent "Waiting" step while preheating step is being carried out.

Once the preheating step is completed, the control system applies the power determined for the "Waiting" step to maintain the heated plates at the cooking temperature. The power required for the subsequent "Cooking" step is determined during the "Waiting" step. Once a food item is placed on the plate, the "Cooking" step commences to cook the food item according to the cooking profile by ensuring the plates are maintained at the cooking temperature.

Figure 3:
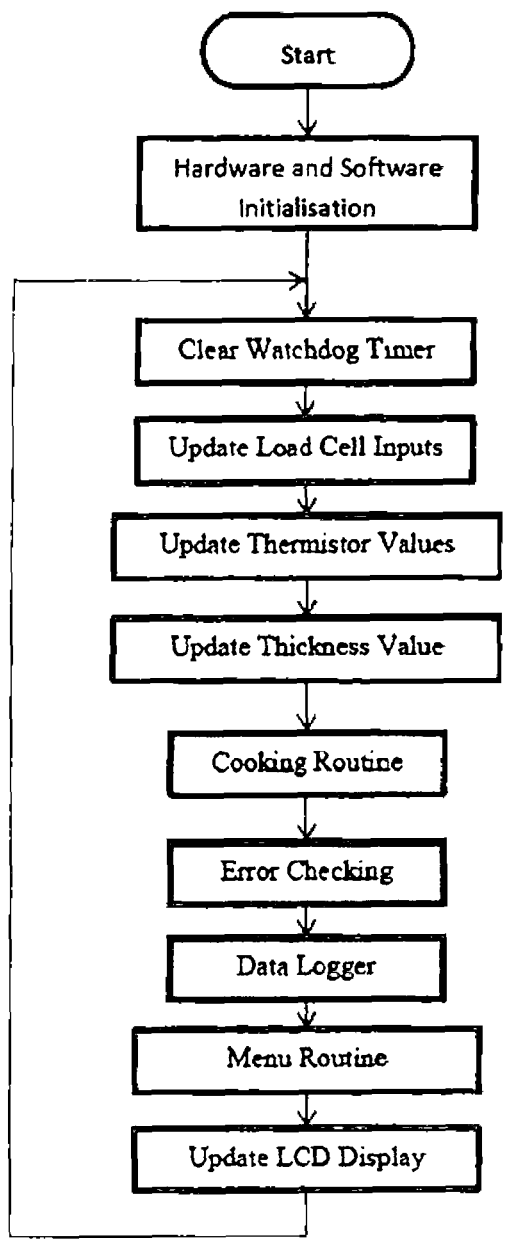
FIG. 3 is a flow chart illustrating the steps taken by the control system to detect errors in the system according to one form of the invention.

The control system also performs a series of checks to identify errors in the system and minimize undesirable operating conditions (see FIG. 3).

In order to cook a food item, the control system calculates the total energy (Q) required to cook the food item according to the cooking profile and calculates the energy that has to be transferred per unit time (q) to the food item in order to cook the food item according to the cooking profile. The amount of energy transferred per unit time to the food item is measured against the total amount of energy required to cook the food item according to the cooking profile. The cooking process completes when the amount of energy transferred into the food item equals the total amount of energy required to cook the food item. Namely, this occurs when:

$$Q=qt,$$

where t is the cooking time.

The amount of energy transferred per unit time to the food item may be regularly monitored and compared against Q. The cooking process stops when the calculated total amount of energy is transferred to the food item.

Alternatively, the time (t) taken to transfer the total amount of energy (Q) to cook the food item is calculated from the amount of energy transferred per unit time, and the cooking process stops when t is reached.

The control system calculates the total energy (Q) required to cook the food item according to the cooking profile based on the measured weight (M) of the food item, the specific heat capacity ($c_p$) of the food item, the required temperature ($T_2$) to achieve the preferred cooking outcome and the initial food item temperature ($T_1$) using the following equation:

$$Q=Mc_p(T_2-T_1)$$

The specific heat capacity of the food item is estimated from literature, for example, from The Engineering ToolBox (www.engineeringtoolbox.com). It may also be derived empirically or may be a combination of literature and empirical values.

The required temperature may be obtained from literature, for example, Green, Aliza, Field Guide to Meat, 2005, and/or empirically, by visual inspection of the food item.

The control system calculates the energy transferred per second to the food item (q) using the following equation where $\Delta T_{top}$ is the temperature difference between the top plate and the food item temperature per unit time, $\Delta T_{btm}$ is the temperature difference between the bottom plate and the food item temperature per unit time and $R_{th}$ is the thermal resistance of the food item:

$$q=\Delta T_{top}R_{th}+\Delta T_{btm}R_{th}, \text{ whereby } \Delta T=T_{top/btm\ plate}-T_{food\ item\ temp}$$

The food item temperature is cumulative, adding the incremental temperature gain to the previous temperature value.

The thermal resistance of the food item is calculated using the following equation:

$$R_{th} = \frac{kA}{x}$$

wherein A is the surface area of the food item in contact with the plates, x is the measured thickness and the k is the thermal conductivity of the food item.

The surface area (A) of the food item is calculated using the measured thickness (x) and weight (M) of the food item, and the density (p) of the food item using the following equation:

$$A = \frac{M}{x\rho}$$

The density of the food item is estimated from literature. It may also be derived empirically or may be a combination of literature and empirical values.

Figure 4:
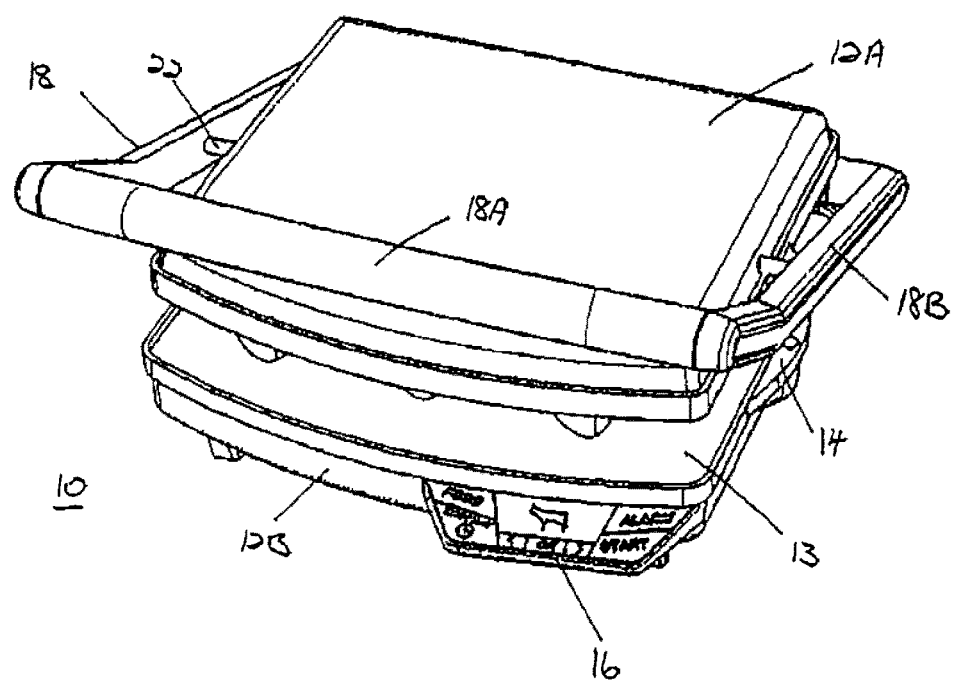
FIG. 4 is a perspective view of one embodiment of a cooking apparatus in accordance with the present invention and having an ultrasonic sensor according to one form of the invention.
Figure 5:
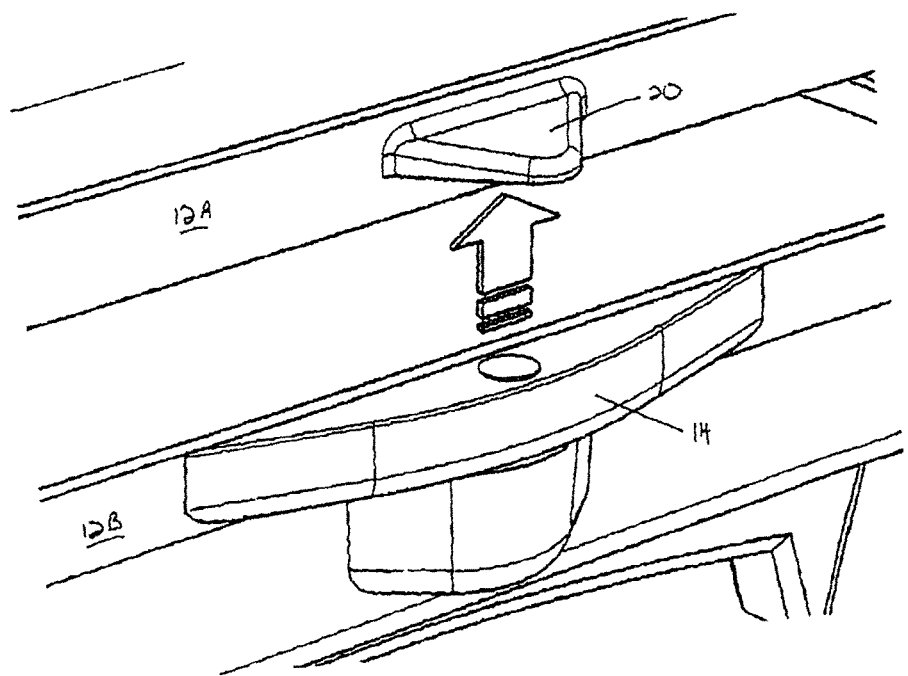
FIG. 5 is an enlarged view of an ultrasonic sensor on the cooking apparatus in FIG. 4 according to one form of the invention.

One form of the cooking apparatus 10 is illustrated in FIGS. 4 and 5.

The cooking apparatus 10 comprises a horizontally arranged top plate 12A and a bottom plate 12B in between which a food item is cooked, wherein each plate has a heating element (not shown) for cooking the food item.

In another embodiment, the pair of plates may be oriented at any angle from a horizontal to a vertical position.

The angle of the pair of plates may allow fluids such as oil or rendering to flow from a food item to reduce fluids from soaking the food item. The angle of the pair of plates, for example, when positioned in a substantially vertical position may allow the food item to be released from the cooking apparatus when the cooking has completed onto a tray or rack positioned below the cooking apparatus.

Figure 6:
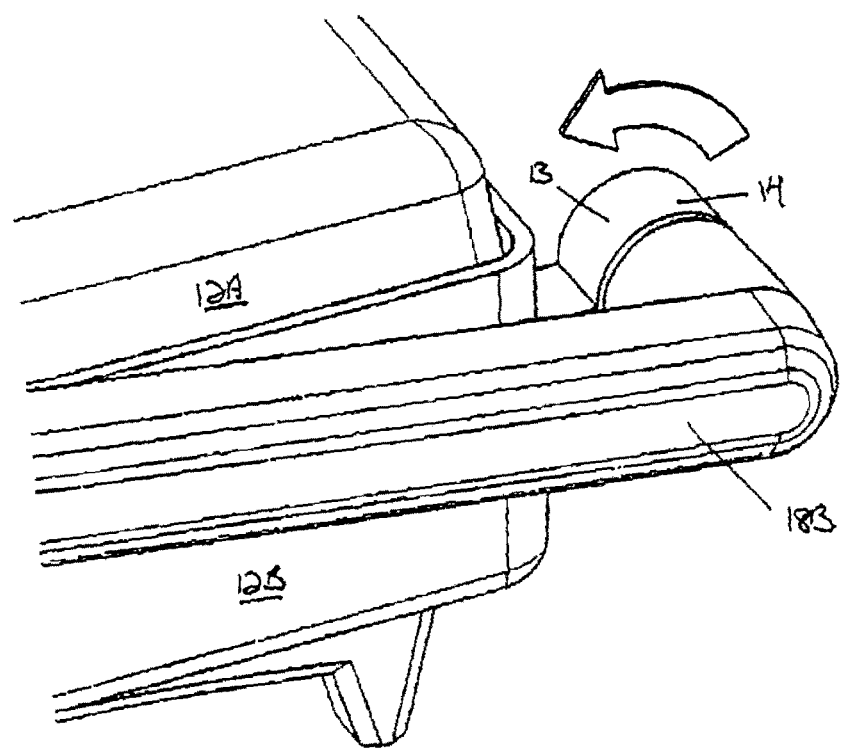
FIG. 6 is an enlarged view of a pivot of a lever arrangement of a cooking apparatus including an angle sensor according to one form of the invention.

The top plate 12A is linked to the bottom plate 12B by a handle 18, whereby the handle 18 is levered to the cooking apparatus 10 to open and close plate 12A and plate 12B (FIG. 6). Handle 18 is substantially 'U' shaped in that it has a gripping bar 18A that extends across a front of the apparatus 10, which is where a user takes hold of the handle, and side arms 18B that extend from each side of the gripping bar down the side of the apparatus to each return at the rear of the apparatus and connect to a rear hinge 13 fixed to the rear of the bottom plate 12B. Rear hinges 13 provide the pivot point that allows handle 18 to lever up and down in order to open and close the top plate 12A of the cooking apparatus. Each side of the top plate 12A is pivoted to the handle 18 through a pivot pin 22 that is mounted on each of the handle's side arms at a point (approximately midway) between the gripping bar and the rear hinge. The top plate 12A is rotatable about pivot pins 22 so that the top plate 12A 'floats' on pins 22 as the cooking apparatus is opened by levering the handle 18 upward. This floating effect is useful to accommodate uneven-shaped food items and to maximise contact of the top plate 12A on the food item.

The cooking apparatus 10 includes a weight sensor 13, and a measurement sensor 14 for measuring a distance between the pair of plates. The measurement sensor 14 may take many forms for measuring the distance between, i.e. the separation of, the plates. For example, the measurement sensor may be a position, angle or displacement sensor using, for instance, an electro-mechanical device (such as a strain gauge) or a transformer or transducer (such as a piezo-electric transducer). It is understood that the examples of sensors provided are illustrative only and that any suitable type of sensor may be incorporated into the cooking apparatus 10.

The cooking apparatus 10 also includes a user interface 820 in the form of a control panel 16 for transmitting data on cooking variables from the user (i.e. the cooking preference) to the control system 870. The user variables are used to determine the cooking profile.

The user interface includes a display device 830 which provides a visual indication of the user selection and a user input device 840 for the user to enter data on the cooking variables.

The control system 870 receives signals from the measurement sensor 14, the weight sensor 13 and the control panel 16 to calculate the total amount of energy required to cook the food item and to calculate the amount of energy being transferred to the food item during the cooking process, which in turn, is used to control the heating elements on the pair of plates, namely to ensure the temperature on the plates is maintained at the cooking temperature.

The cooking apparatus described herein automates and controls cooking based on the total amount of energy required to cook the food item and the amount of energy per unit time transferred to the food item. This allows the food item to be cooked consistently to the preferred cooking outcome regardless of the thickness or weight of the food item.

In contrast, a conventional comparable cooking apparatus would rely on manual inspection and adjustment of a food item by a user to control the cooking process. This is time consuming and often inconvenient for a user who has to watch and move the food item on the cooking apparatus as needed.

The cooking apparatus 10 takes into account the type of food item cooked. Different types of food such as red meat, fish and chicken cook at different rates at the same temperature.

As such, there is a low likelihood of overcooking or undercooking a food item with the described cooking apparatus.

The cooking apparatus 10 allows a user to automate the cooking process without requiring the user to tend to the food item during the cooking process to produce consistently cooked food items. It achieves this by selecting a cooking preference (i.e. selecting the type of food item and preferred cooking outcome) which determines the cooking profiles available to cook the food item to the desired cooking outcome.

Based on the weight and thickness of the food item, a cooking profile is determined which in turn determines the cooking temperature or range of cooking temperatures to cook the food item. The control system 870 calculates the total energy required to cook the food item to the preferred cooking outcome and the amount of energy to be transferred to the food item per unit time. The calculated amount of energy is transferred to the food item to cook the item to the desired cooking outcome.

The weight sensor 13 is a load cell embedded within bottom plate 12B. The measurement sensor 14 measures the distance between the pair of plates. The measurement sensor 14, in the embodiment of FIGS. 4 and 5, is an ultrasonic sensor mounted on the bottom plate 12B. The ultrasonic sensor may be mounted anywhere along the edge of bottom plate 12B and is associated with a projection 20 on top plate 12A that reflects a signal from the ultrasonic sensor. The ultrasonic sensor operates similar to known ultrasonic sensors in that the distance between the pair of plates is determined by the time taken for a signal to return to the sensor 14 after reflecting off the projection 20 on the top plate 12A.

The projection 20 may be located on the handle 18 instead of top plate 12A, as handle 18 is associated with movement of the top plate. Accordingly, the position of the projection 20 on the handle 18, when the top plate 12A contacts a food item placed on bottom plate 12B, is used by the ultrasonic sensor to calculate the distance between the pair of plates.

In another embodiment of the cooking apparatus (illustrated in FIG. 6), the measurement sensor 14 is an angle sensor located at the pivot point at rear hinge 13 through which the top and bottom plates are pivoted. As the handle 18 is levered to receive a food item such as a steak between the pair of plates, the sensor 14 measures the angle of the pivot at the rear hinge compared to a reference point, such as fully closed position with no food item between the plates. From the angle of pivot the distance between the pair of plates can be calculated by determining a corresponding change in angle through which the handle is pivoted.

Figure 7:
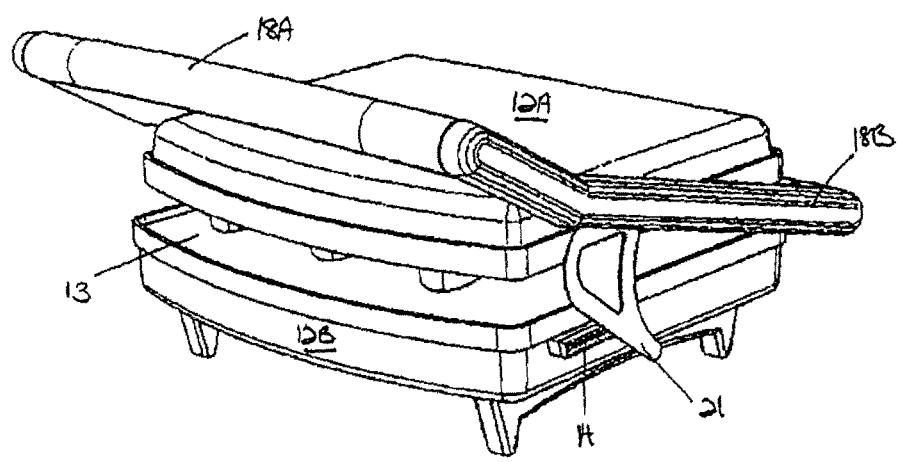
FIG. 7 is a perspective view of a cooking apparatus including a light beam sensor according to one form of the invention.

In the embodiment illustrated in FIG. 7, the measurement sensor 14 is an optical position sensor that includes a curtain of light beams mounted along the edge of the bottom plate 12B. The curtain of light beams are associated with a blocking cover 21 and the sensor measures the distance between the pair of plates based on the number of beams disrupted or blocked by a blocking cover 21.

The blocking cover 21 is mounted on the top plate 12A and is positioned to disrupt or block the curtain of discrete light beams as the distance between the pair of plates decreases. For example, in an inoperative position whereby the top plate 12A is at a maximum distance from the bottom plate 12B, the light beams are completely exposed. As the top plate 12A is lowered towards the bottom plate 12B, the blocking cover 21 gradually covers a number of light beams, such that all the light beams are completely blocked when the top plate 12A contacts the bottom plate 12B. The sensor 14 measures the distance between the pair of plates based on the number of light beams covered by the blocking cover 21 (FIG. 7).

The blocking cover 21 may alternatively be located on a side arm of the handle 18 rather than of the top plate 12A. In that embodiment, the number of light beams covered by the blocking cover 21 on handle 18 when the top plate 12A contacts a food item placed on bottom plate 12B is used controller to calculate the distance between the pair of plates.

Figure 8:
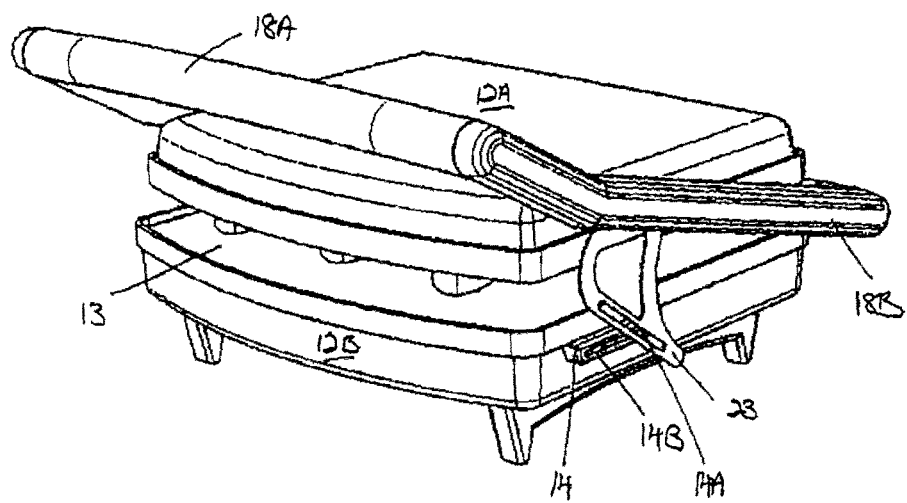
FIG. 8 is a perspective view of a cooking apparatus including a slider sensor according to one form of the invention.

In the embodiment of the cooking apparatus illustrated in FIG. 8, the measurement sensor 14 comprises a sliding pin 14A that is mounted to a printed circuit board located within the bottom plate 12B at one end and movably connected to a guide 23 that is mounted to handle 18 at the other end. The guide 23 has a slot to receive sliding pin 14A such that as the top plate 12A moves towards the bottom plate 12B, the sliding pin 14A moves proportionally with the distance between the pair of plates along a track 14B to transmit a signal to the control system to measure the distance between the pair of plates (FIG. 8). The distance moved by the sliding pin 14A along the track provides an indication of the separation between the top and bottom plates.

The cooking apparatus may include more than one measurement sensor. For example, a pair of measurement sensors may be located on diametrically opposed corners of one plate. This arrangement allows the control system to determine an average separation between the pair of plates based on an average reading of the distances between each measurement sensor. This can be used to determine the thickness of unevenly-shaped food items.

Figure 14:
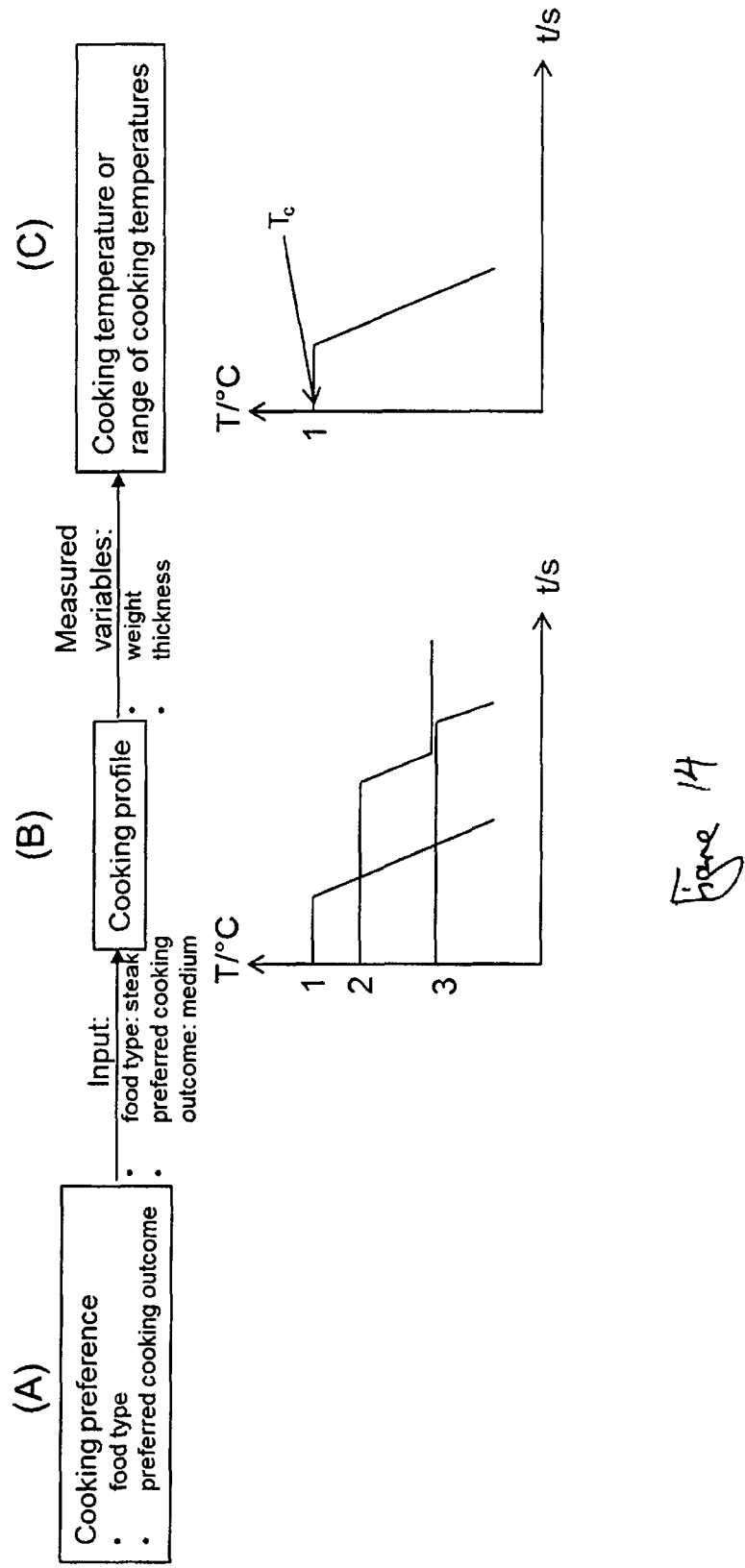
FIG. 14 is a flow chart according to one form of the invention.

FIG. 14 is a flow chart according to an embodiment of the invention.

In operation, a user uses the control panel 16 to select the cooking preference by selecting settings such as the type of food item to be cooked and preferred cooking outcome for the food item. For example, a user can cook a piece of steak to "medium" by pressing the appropriate buttons on control panel 16 (Step (A) in FIG. 14). The user's selection will be transmitted to the control system.

The food item is placed onto the bottom plate 12B and the handle 18 is moved to contact the top plate 12A with the steak.

The top plate 12A is connected to the handle 18 about the pivot pin 22 to form a self-centering top plate whereby the top plate 12A self-pivots on the contour of the food item (FIG. 4). In this embodiment, the pair of plates may not be parallel to each other during the cooking process. This embodiment is suitable for uneven shaped food items such as a whole chicken or fish, whereby the pivotable nature of the top plate 12A allows maximum contact of the top plate 12A with the food item.

Figure 9:
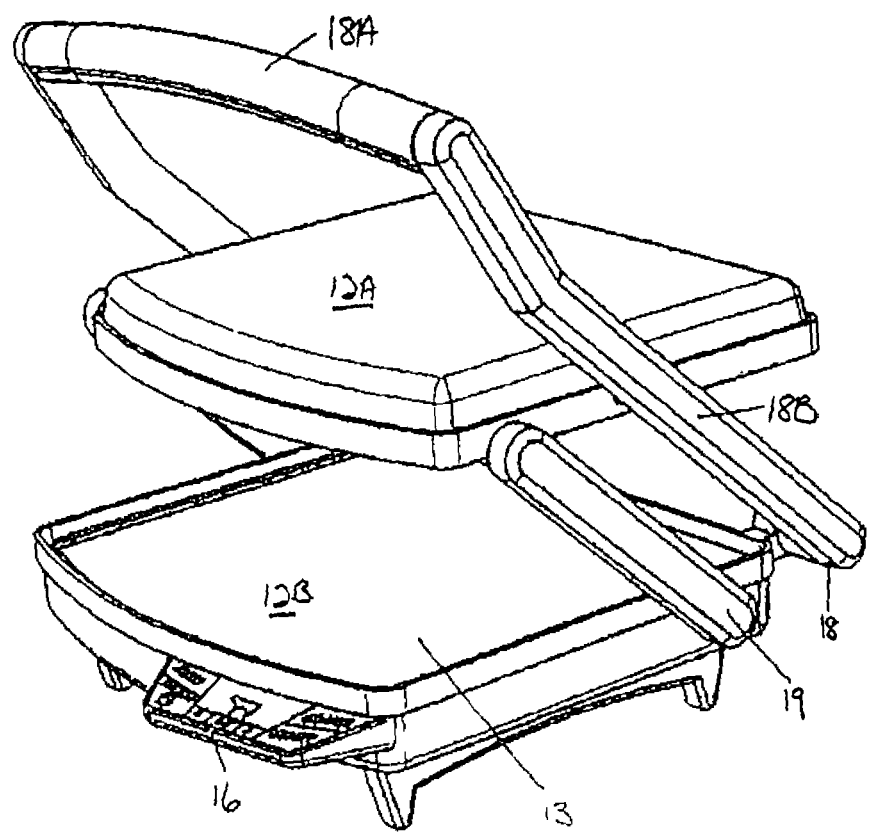
FIG. 9 is a perspective view of a cooking apparatus including a four-bar linkage handle according to one form of the invention.

In another embodiment of the cooking apparatus, the top plate 12A is connected to the handle 18 by a four-bar linkage (FIG. 9). As in previous embodiments, the handle side arms are linked to the bottom plate 12B through rear hinge 13, but the top plate 12A is further linked to the bottom plate 12B by a pair of short arms 19 which connect the pair of plates in a diagonal fashion and which short arms 19 are parallel to the handle side arms. As illustrated in FIG. 9, short arm 19 is connected toward the rear of the bottom plate 12B at one end and connected to the front of the top plate 12A at the other end to form a link between the pair of plates.

This arrangement maintains the top plate 12A parallel to the bottom plate 12B regardless of the contours of the food item. This embodiment is suitable for flat-shaped food items such as a piece of steak or a fish fillet which do not require the top plate 12A to pivot to maintain maximum contact with the food item.

Once the top plate 12A contacts the food item by levering the handle 18 about the rear hinge 13, the control system uses the weight signal from the weight sensor 13 and/or the measurement signal from the measurement sensor 14 to calculate the total amount of energy required to cook the food item and to determine a cooking profile (Step (B) of FIG. 14). Alternatively, the cooking profile may be selected by a user.

The determined cooking profile specifies how the food item is to be cooked using the calculated total amount of energy by determining the temperature or a range of temperatures at which the food item is to be cooked ($T_c$ in Step (C) of FIG. 14). For example, the food item may be subjected to (i) a high searing temperature for a short period of time (Cooking profile (1) in Step (B) of FIG. 14), (ii) a lower searing temperature for a longer period of time followed by a constant low temperature "warming" heat (Cooking profile (2) in Step (B) of FIG. 14) or (iii) a low cooking temperature for an extended period of time (Cooking profile (3) in Step (B) of FIG. 14). Each of these cooking profiles transfers the same amount of energy to the food item at the end of the cooking process. In an alternative embodiment, Steps (B) and (C) can occur at the same time.

The plates 12A and 12B are then preheated to the determined temperature. The cooking process completes when the amount of energy transferred into the food item equals the total amount of energy required to cook the food item.

Throughout the cooking process the control system 870 regularly compares the amount energy transferred to the food item per unit time against the total amount of energy required to cook the food item (according to the determined cooking profile) to determine when the cooking process is completed, and to additionally determine the percentage of completion of the cooking process, which is displayed on the display device 830.

The control system performs various functions including:
(a) determining a cooking profile for cooking the food item according to the cooking preference based on the user's selection and at least one of the thickness and weight of the food item;
(b) switching on the heating element;
(c) determining a time that has lapsed since the heating element is switched on;
(d) determining a cooking temperature of the heating element based on the cooking profile from the time since the heating element is switched on;
(e) measuring a temperature of the heating element; and
(f) controlling the heating element to either increase or decrease an input current based on the cooking temperature and the current temperature of the heating element to thereby either increase or decrease the temperature of the heating element;

(g) calculating the total amount of energy required to cook the food item according to the cooking profile based on the weight of the food item;

(h) calculating the amount of energy transferred to the food item per second based on the weight of the food item and the distance between the pair of plates (i.e. the thickness of the food item); and (i) controlling the heating element to stop transfer of energy into the food item once the energy transferred to the food item equals the total energy required to cook the food item.

Figure 13:
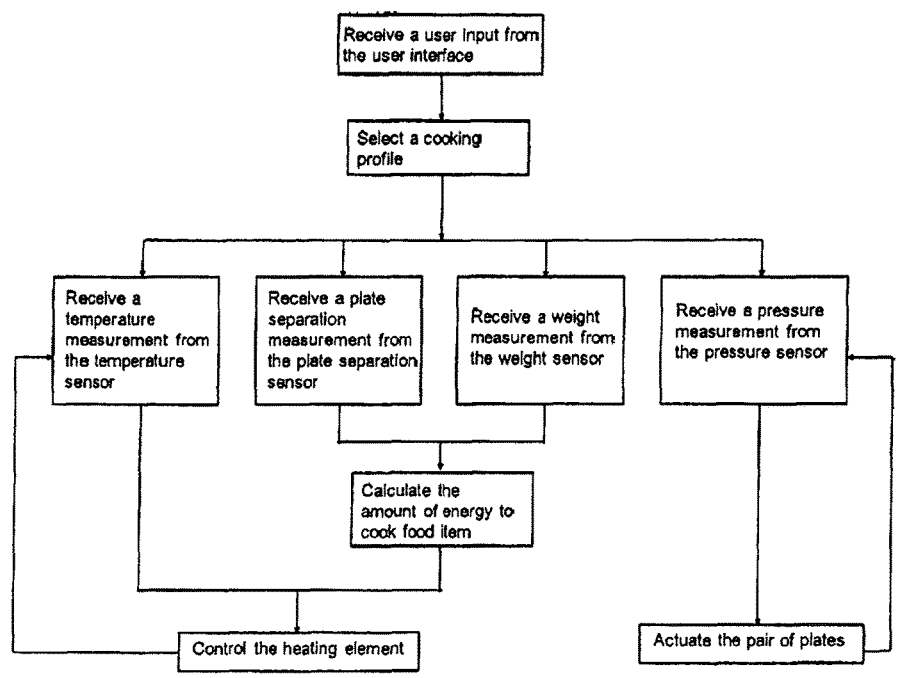
FIG. 13 is a flow chart illustrating the function of the control system of the cooking apparatus according to one form of the invention.

FIG. 13 demonstrates some of the above functions of the control system and the functional relationships between the control system and the user interface, sensors and plates.

Figure 12:
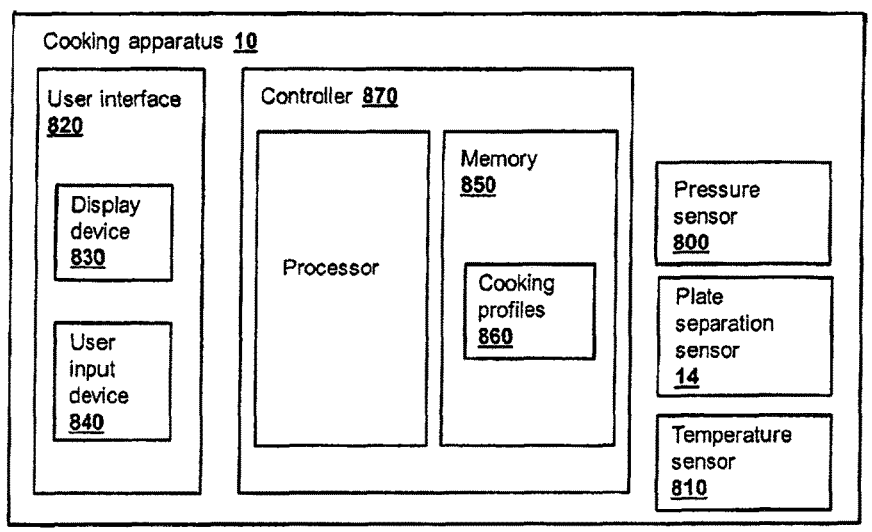
FIG. 12 is a block diagram schematically illustrating components of the cooking apparatus according to one form of the invention.

FIG. 12 illustrates the physical relationship of the components of the cooking apparatus.

The temperature sensor 810 provides real time information on the plate temperature to indicate to a user when to load the food item into the apparatus.

As discussed above, a temperature sensor 810 could be embedded into one or both of top plate 12A and bottom plate 12B to determine the starting temperature of the food item. A signal transmitted from the temperature sensor 810 to the control system could be used to adjust the cooking temperature and/or cooking time if, for example, a food item is placed in between the plates before a pre-heat temperature is reached.

The present cooking apparatus has the ability to control the cooking process by taking into account the thickness and weight of the food item. This means that the cooking apparatus can apply a shorter cooking time to the food item to achieve a desired cooking outcome, without the risk of overcooking or undercooking the food item.

The cooking apparatus may include other optional features to enhance usability or improve cooking outcomes. For example, the control panel 16 may include a memory for saving parameters such as specific heat capacity values and thermal conductivity values. These parameters can be entered by a user.

Figure 10:
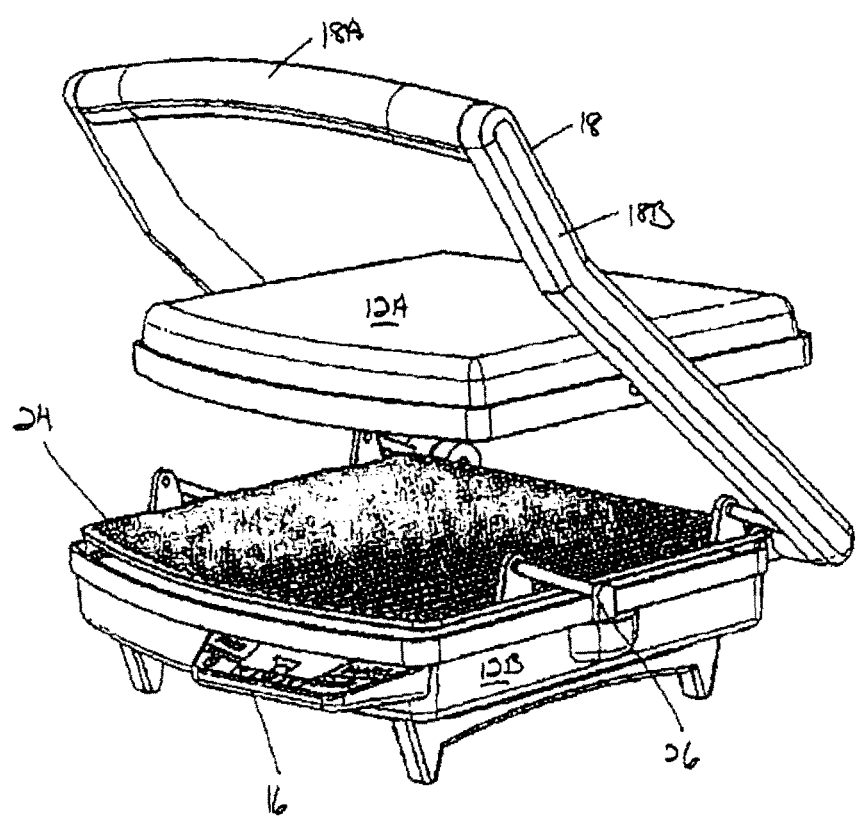
FIG. 10 is a perspective view of a cooking apparatus with a rack for lifting the food item from the bottom plate after cooking according to one form of the invention.

As illustrated in FIG. 10, the cooking apparatus 10 may also include a rack 24 which is actuated to lift the food item away from the pair of plates after completion of the cooking process. The rack 24 is mounted to the bottom plate 12B by an upwardly biased spring-loaded hinge 26. During the cooking process, the food item is placed on the rack and the top plate 12A is lowered to contact the food item using the handle 18. As the top plate contacts the food item, the rack 24 is pushed onto and contacts the bottom plate 12B. Accordingly, during the cooking process, the food item is in direct contact with the rack 24 which is in turn heated by the bottom plate 12B.

Once cooking is finished, the handle is either manually or automatically moved to lift the top plate away from the food item. Without the pressure of the top plate against the food item, the spring-loaded hinge 26 lifts rack 24 off the bottom plate 12B to allow the food item to rest in a warm position but away from direct heat.

In another embodiment of the cooking apparatus, the bottom plate 12B includes an embedded plate pressure sensor 800 to transmit a signal to the control system in response to any changes in pressure on the plate.

The pair of plates may be controlled to move in response to a change in thickness or height of the food item. For example, loss of moisture from a piece of steak during cooking will result in shrinkage and consequently, thickness of the piece of steak. As a result, the steak could lose contact with the top plate 12A, which will affect the cooking process.

Furthermore, the pair of plates may be automated by the control system based on the signal from the plate pressure sensor 800 to allow the pair of plates to move in response to any changes in thickness of the food item to maintain contact between the plates and the food item without exerting excessive pressure.

For example, a response from the control system to a change in pressure resulting from shrinkage of the steak would be to lower the top plate 12A and restore contact with the steak, but without applying too much pressure.

Additionally, the plate pressure sensor 800 can also detect whether excessive pressure has been exerted on the steak. In response, the control system would raise the top plate 12A from the steak.

Continuous monitoring and movement of the pair of plates with any changes in thickness of the steak ensures contact between the steak and the pair of plates is maintained during the cooking process and ensures that the piece of steak is consistently cooked. Accordingly, the cooking apparatus is able to adjust cooking parameters and cooking functions in real time during the cooking process in response to feedback from various distance, pressure and temperature sensors.

As discussed above, the control system may automate the top plate 12A to raise the top plate from the steak. Removing the plate 12A from contact with the food item reduces the likelihood of the food item overcooking. For example, in FIGS. 4 to 9 and 11, the top plate 12A may lift off the food item to allow the food item to rest on the bottom plate.

In combination with the rack 24 positioned on the bottom plate 12B as described above, upon completion of the cooking time the top plate may be moved away from the food item and at the same time, the rack raises the food item off the bottom plate. FIG. 10 illustrates this embodiment where the top plate 12A lifts off the food item which in turn causes the rack 24 to be raised off the bottom plate 12B to allow the food item to rest.

After the cooking process has concluded, the control system could be programmed to transmit an audio and/or visual signal to indicate completion of cooking to a user.

Figure 11:
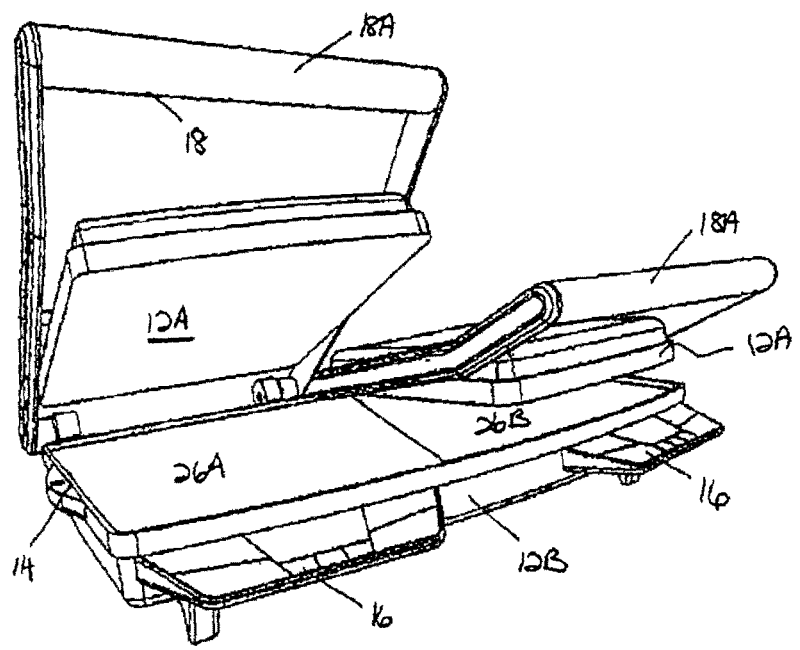
FIG. 11 is a perspective view of a cooking apparatus with zoned cooking areas according to one form of the invention.

The cooking apparatus may furthermore include zoned cooking areas, whereby one heating element is positioned adjacent another heating element, whereby the heating elements are located on side by side twin pairs of plates to provide localised heating to one area of the cooking apparatus. FIG. 11 illustrates this embodiment.

Specifically, FIG. 11 shows heating elements positioned to create zones 26A and 26B on the bottom plate 12B which are heatable to different temperatures. Corresponding heating elements are provided in two independently movable top plates 12A each overlying a zone 26A or 26B. Zones 26A and 26B comprise separate heating elements that are localised to function independently to heat the corresponding zone based on different cooking profiles that are controlled by separate control panels 16. This allows multiple food items to be cooked simultaneously based on different predetermined settings and/or cooking outcomes that can be programmed via separate control panels 16.

The cooking apparatus may include a cover such as a shell that covers the pair of plates 12A and 12B during the cooking process so that the splattering of fluids such as oil during the cooking process is reduced. The cover also allows the food item to rest in an enclosed space to minimize heat loss.

In another embodiment, the cooked food item is maintained at the target temperature after completion of the cooking process to avoid the need for a resting step (see Example 3). Advantageously, this prevents the cooked food item from getting cold before it is consumed.

Example 1

Type: Beef steak
Weight: 198 g
Thickness: 13 mm
Target temperature ($T_2$): 63° C. (Medium)
Initial temperature ($T_1$): 17° C.
Cooking temperature: 190° C.
Thermal conductivity of beef: 0.780 W/mK
Cooking time: 55 seconds The thermal conductivity of beef was determined empirically and takes into consideration the thermal conductivity of beef and the plate.

The plates were pre-heated to 190° C. based on the user selection of "beef steak" and "medium", rising at a rate of around 25° C. per minute. The core temperature of the steak was measured by inserted a temperature probe into the center of the steak.

Figure 15:
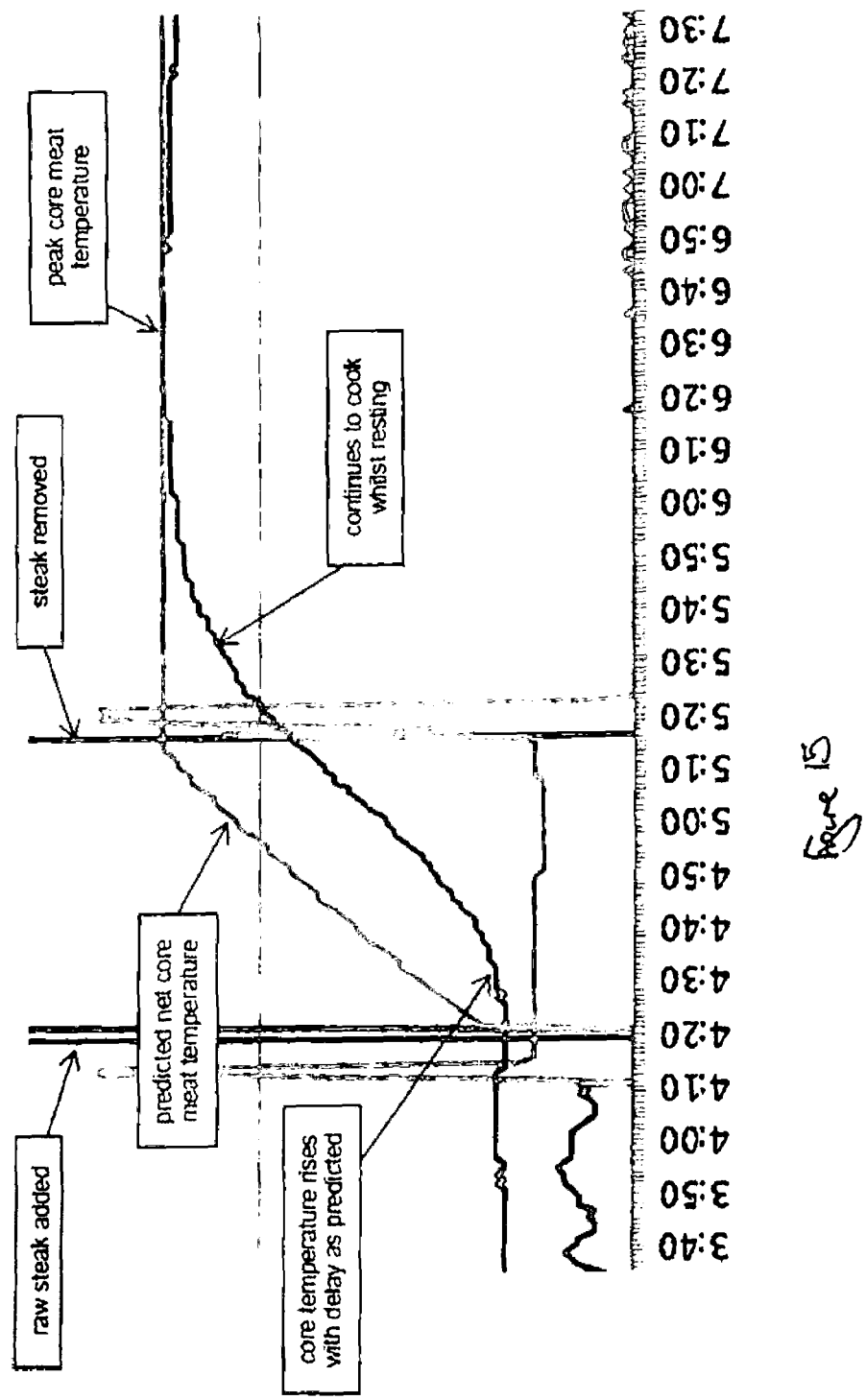
FIG. 15 illustrates the temperature profile of the core meat temperature against the theoretical thermodynamic curve of Example 1.

The steak was cooked on the plates maintained at 190° C. for 55 seconds (from about 4:20 to about 5:15 in FIG. 15) and rested for 80 seconds to achieve the desired cooking outcome (from about 5:15 to 6:35 in FIG. 15). The cooking time was based on the time taken to transfer the calculated total amount of energy required to cook the food item to the food item.

The temperature profile of the core meat temperature against the theoretical thermodynamic curve is illustrated in FIG. 15, which indicates that the actual core temperature of the steak follows the target temperature of 63° C. based on the required energy calculations. A visual inspection of the cooked steak also confirms that the steak was cooked to medium.

Example 2

Type: Beef steak
Weight: 183 g
Thickness: 15 mm
Target temperature ($T_2$): 62° C. (Medium)
Initial temperature ($T_1$): 13° C.
Cooking temperature: 190° C.
Thermal conductivity of beef: 0.780 W/mK
Cooking time: 65 seconds.

Figure 16:
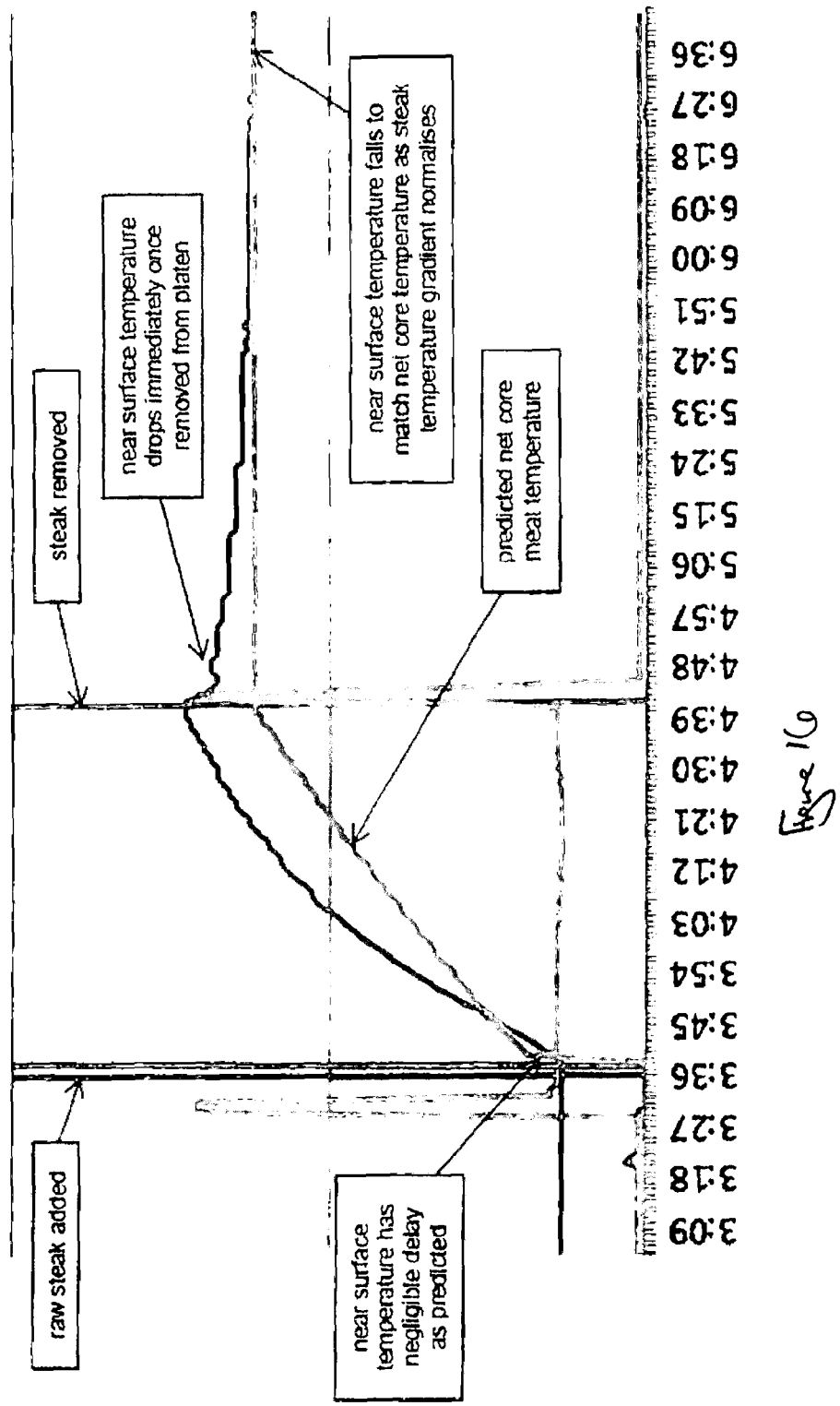
FIG. 16 illustrates the temperature profile of the surface meat temperature against the theoretical thermodynamic curve of Example 2.

The experimental set up is similar to Example 1. The temperature profile of the surface meat temperature against the theoretical thermodynamic curve is illustrated in FIG. 16, which indicates that the actual surface temperature of the steak follows the theoretical thermodynamic curve.

The steak was cooked on the plates maintained at 190° C. for 65 seconds (from about 3:37 to about 4:42 in FIG. 15) and rested for 69 seconds to achieve the desired cooking outcome (from about 4:42 to 5:51 in FIG. 15).

Example 3

Type: Beef steak
Weight: 194 g
Thickness: 20 mm
Target temperature ($T_2$): 90° C. (Well done)
Initial temperature ($T_1$): 5° C.
Cooking temperature: 200° C.
Thermal conductivity of beef: 0.780 W/mK
Cooking time: 90 seconds.

The thermal conductivity of beef was determined empirically and takes into consideration the thermal conductivity of beef and the plate.

The plates were pre-heated to 200° C. based on the user selection of "beef steak" and "well done". The core temperature of the steak was measured by inserted a temperature probe into the center of the steak.

Figure 17:
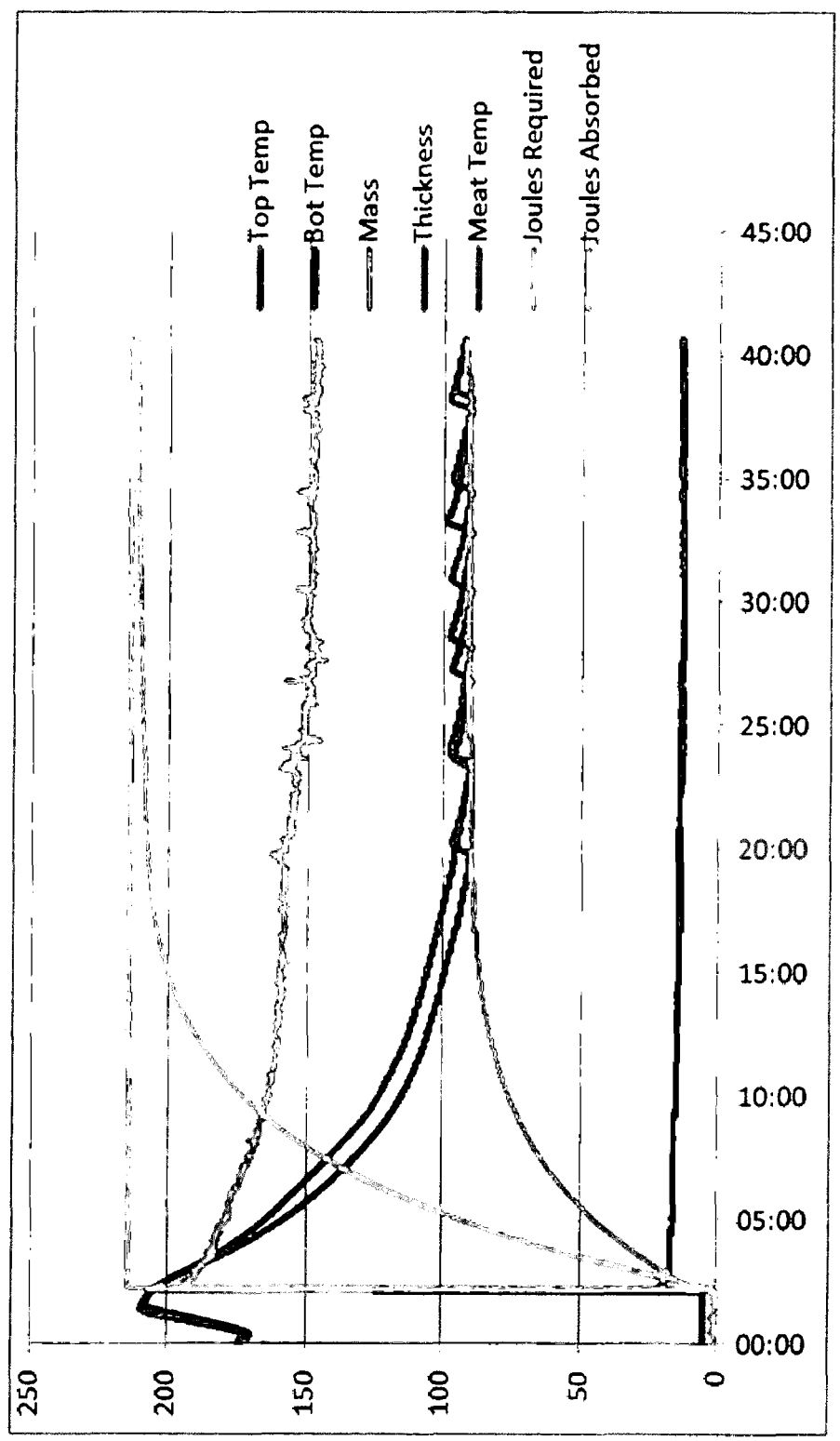
FIG. 17 illustrates the temperature profile of the core meat temperature against the theoretical thermodynamic curve of Example 3.

The steak was cooked on the plates maintained at 200° C. for 90 seconds (from about 0:00 to about 01:30 in FIG. 17). Thereafter, the plate temperature is reduced to allow the steak to maintain the target temperature of 90° C. without being removed from the plate to rest (from about 20:00 to 40:00).

The temperature profile of the core meat temperature against the theoretical thermodynamic curve is illustrated in FIG. 17, which indicates that the actual core temperature of the steak is maintained at the target temperature of 90° C.

It will be understood to persons skilled in the art of the invention that many modifications may be made without departing from the spirit and scope of the invention.

The invention claimed is:

1. A cooking apparatus comprising:
    a pair of plates in between which a food item is to be cooked, at least one of the plates having a heating element for cooking the food item;
    a user interface for selecting a cooking preference;
    a measurement sensor for measuring a distance between the pair of plates when the food item lies between the pair of plates;
    a weight sensor for measuring weight of the food item; and
    a control system for receiving at least one signal from the measurement and weight sensors to determine a cooking profile for cooking the food item to a cooking preference and to calculate a total amount of energy required to cook the food item according to the cooking profile and an amount of energy to be transferred per unit time to the food item, and to control power supply to the heating element based on the calculated amount of energy transferred per unit time to the food item.

2. The cooking apparatus according to claim 1, wherein the control system predicts when the food item is cooked by monitoring an amount of energy transferred to the food item, wherein the food item is predicted as cooked when the amount of energy transferred to the food item substantially equals the total amount of energy required to cook the food item.

3. The cooking apparatus according to claim 1, wherein the control system compares an amount of energy transferred to the food item to the total amount of energy required to cook the food item during the cooking process.

4. The cooking apparatus according to claim 3, wherein the comparison is conducted at discrete intervals.

5. The cooking apparatus according to claim 2, wherein the control system stops supplying power to the heating element once the energy transferred to the food item equals the amount of energy required to cook the food item.

6. The cooking apparatus according to claim 2, wherein the control system reduces the power supply to the heating element to maintain the plates at a predetermined temperature after cooking completes.

7. The cooking apparatus according to claim 1, wherein the cooking apparatus uses a closed loop transfer function to regulate cooking temperature to ensure that the food item is cooked according to the selected cooking preference.

8. The cooking apparatus according to claim 1, wherein each plate includes a thermocouple for measuring the local temperature and providing feedback to the control system.

9. The cooking apparatus according to claim 1, wherein the control system calculates the total amount of energy required to cook the food item according to the cooking profile based on the weight of the food item and a temperature difference between cooking temperature and initial food item temperature.

10. The cooking apparatus according to claim 1, wherein the total amount of energy required to cook the food item according to the cooking profile is calculated using the following equation, wherein Q is the total amount of energy required to cook the food item according to the cooking profile, $C_p$ is a specific heat capacity of the food item, M is a weight of the food item, $T_2$ is a required target temperature to achieve the cooking preference and $T_1$ is an initial food item temperature:

$$Q = Mc_p(T_2 - T_1)$$

11. A cooking apparatus comprising:
a pair of plates in between which a food item is to be cooked, at least one of the plates having a heating element for cooking the food item;
a user interface for selecting a cooking preference;
a measurement sensor for measuring a distance between the pair of plates when the food item lies between the pair of plates;
a weight sensor for measuring weight of the food item; and
a control system for receiving at least one signal from the measurement and weight sensors to determine a cooking profile for cooking the food item to the cooking preference and to calculate a total amount of energy required to cook the food item according to the cooking profile and an amount of energy to be transferred per unit time to the food item, and to control power supply to the heating element based on the calculated amount of energy transferred per unit time to the food item,
wherein the control system calculates the amount of energy (q) transferred to the food item per unit time based on the thickness and weight of the food item, and wherein the amount of energy (q) transferred to the food item per unit time is calculated using the following equation, wherein $\Delta T_1$ is a temperature difference between a first plate ($T_{plate\ 1}$) and a food item temperature ($T_{food\ item\ temp}$) per unit time and $\Delta T_2$ is a temperature difference between a second plate ($T_{plate\ 2}$) and the food item temperature ($T_{food\ item\ temp}$) per unit time and $R_{th}$ is a thermal resistance of the food item:

$$q = \Delta T_1 R_{th} + \Delta T_2 R_{th}, \text{ wherein } \Delta T = T_{plate\ 1/2} - T_{food\ item\ temp}$$

and, wherein the thermal resistance of the food item is calculated based on a surface area of the food item in contact with the pair of plates, a thickness of the food item and a thermal conductivity of the food item.

12. The cooking apparatus according to claim 1, wherein the pair of plates is movable relative to one another to maintain contact with the food item during cooking based on feedback from a plate pressure sensor.

13. The cooking apparatus according to claim 1, including a rack that is actuatable to lift the food item off a plate after completion of cooking.

14. The cooking apparatus according to claim 1, including zoned cooking areas, whereby each zone comprises a heating element that is localized to function independently to heat a corresponding zone at an independent cooking profile to the other zones.

15. A control system for a cooking apparatus, the cooking apparatus comprising a pair of plates, at least one of the plates having a heating element for cooking a food item, a measurement sensor for measuring a distance between the pair of plates when the food item lies between the pair of plates, and a weight sensor for measuring a weight of the food item, wherein the control system is configured to:
receive data from a user interface to select a cooking preference;
receive a signal from the measurement sensor to calculate the distance between the pair of plates;
receive a signal from the weight sensor to determine a weight of the food item;
determine a cooking profile to cook the food item according to the cooking preference, where the cooking profile is determined based on at least one signal from the measuring sensor and the weight sensor;
calculate a total amount of energy required to cook the food item according to the cooking profile based on the signal from the weight sensor;
calculate an amount of energy per unit time to be transferred to the food item per unit time based on the signal from the measuring sensor;
switch on the heating element; and
control the heating element based on the cooking profile.

16. The control system for a cooking apparatus according to claim 15, wherein the control system compares the total amount of energy required to cook the food item according to the cooking profile and the amount of energy transferred to the food item per unit time to determine a percentage completion of a cooking process.

17. The control system for a cooking apparatus according to claim 15, wherein the control system performs the following steps for controlling the heating element:
determine a time that has lapsed since the heating element is switched on;
determine a temperature of the heating element based on the cooking profile from the time since the heating element is switched on;
measure a temperature of the heating element; and
control the heating element to either increase or decrease in temperature based on the cooking profile and a current temperature of the heating element to thereby either increase or decrease the temperature of the heating element.

18. A cooking apparatus according to claim 1, wherein the user interface is a control panel on the cooking apparatus, a smart phone app, or a remote control.

19. A cooking apparatus according to claim 11, wherein the user interface is a control panel on the cooking apparatus, a smart phone app, or a remote control.

20. A cooking apparatus according to claim 15, wherein the user interface is a control panel on the cooking apparatus, a smart phone app, or a remote control.

* * * * *